United States Patent [19]

Teich

[11] Patent Number: 4,615,078

[45] Date of Patent: Oct. 7, 1986

[54] GRIPPING TOOL

[76] Inventor: Kurt P. Teich, 5816 N. Sheridan Rd., Chicago, Ill. 60660

[21] Appl. No.: 733,064

[22] Filed: May 13, 1985

[51] Int. Cl.⁴ .................. A22C 25/06; A47G 35/00
[52] U.S. Cl. ............................................ 17/66; 17/70; 294/25
[58] Field of Search .............. 17/66, 70; 294/25

[56] References Cited

U.S. PATENT DOCUMENTS

| 1,006,367 | 10/1911 | Dittmar | 17/66 X |
| 3,318,626 | 5/1967 | Hansen | 294/25 X |
| 4,211,445 | 7/1980 | Woods | 294/25 |
| 4,435,008 | 3/1984 | Black | 294/25 |

Primary Examiner—Willie G. Abercrombie
Attorney, Agent, or Firm—Larry I. Golden

[57] ABSTRACT

A generally S-formed, pliable metallic strip with gripping surfaces thereon is shaped to enable a user to grip a fish fillet between the thumb and forefinger.

10 Claims, 7 Drawing Figures

GRIPPING TOOL

BACKGROUND OF THE INVENTION

1. Field of the Invention

This invention relates to the field of gripping devices and more particularly to a fish gripping tool which is adapted to enable a user to grip a fish fillet between the thumb and forefinger to facilitate the ready removal of skin from the fillet.

2. Description of the Prior Art

Numerous gloves have been provided for assisting in performing cleaning, scaling and skinning operations on fish. The fish can be extremely slippery, making it very difficult to obtain a secure grip while maintaining sufficient freedom of movement to perform the operations both safely and efficiently. The gloves may be provided with finger portions having transverse corrugations for gripping the fish body or fillet. Blades or other attachments may also be provided to assist the user in cutting and scaling operations on the fish. There is a need, however, for an economical, easy to use device which will enable a user to readily grip a fish fillet and to pull the skin during the skinning operation of the fillet.

SUMMARY OF THE INVENTION

A generally S-formed, pliable metallic strip has a hooked head portion and an oppositely hooked tail portion with the head portion including gripping means providing an abrasive outer surface against which a fish fillet can be held by a user.

The gripping means is provided by a plurality of punched perforations. Generally square or diamond shaped perforations are formed by a punching or swaging operation which bends the metal outward to form four generally triangular sides and thereby provides four sharp gripping points for each perforation. Several offset rows of perforations are provided on the head portion to provide a sufficient gripping area.

It is an object of the invention to provide an economical, easy-to-use gripping device which can be used to grip the skin and a portion of the fish fillet during the skinning process.

It is a further object of this invention to provide a versatile gripping device which can be used on either the right hand or the left hand of a user.

It is another object of this invention to provide an adjustable gripping device which can readily be formed to the size of the fingers for the comfort of the user.

Additional objects and features will be apparent from the following specification including the appended claims and drawings.

DESCRIPTION OF PREFERRED EMBODIMENT

Figure 1:
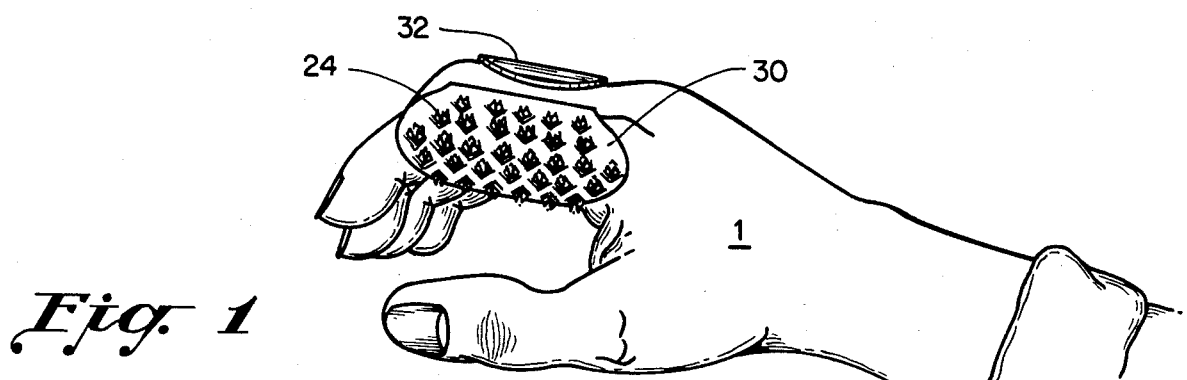
FIG. 1 shows the gripping tool on the hand of a user.
Figure 7:
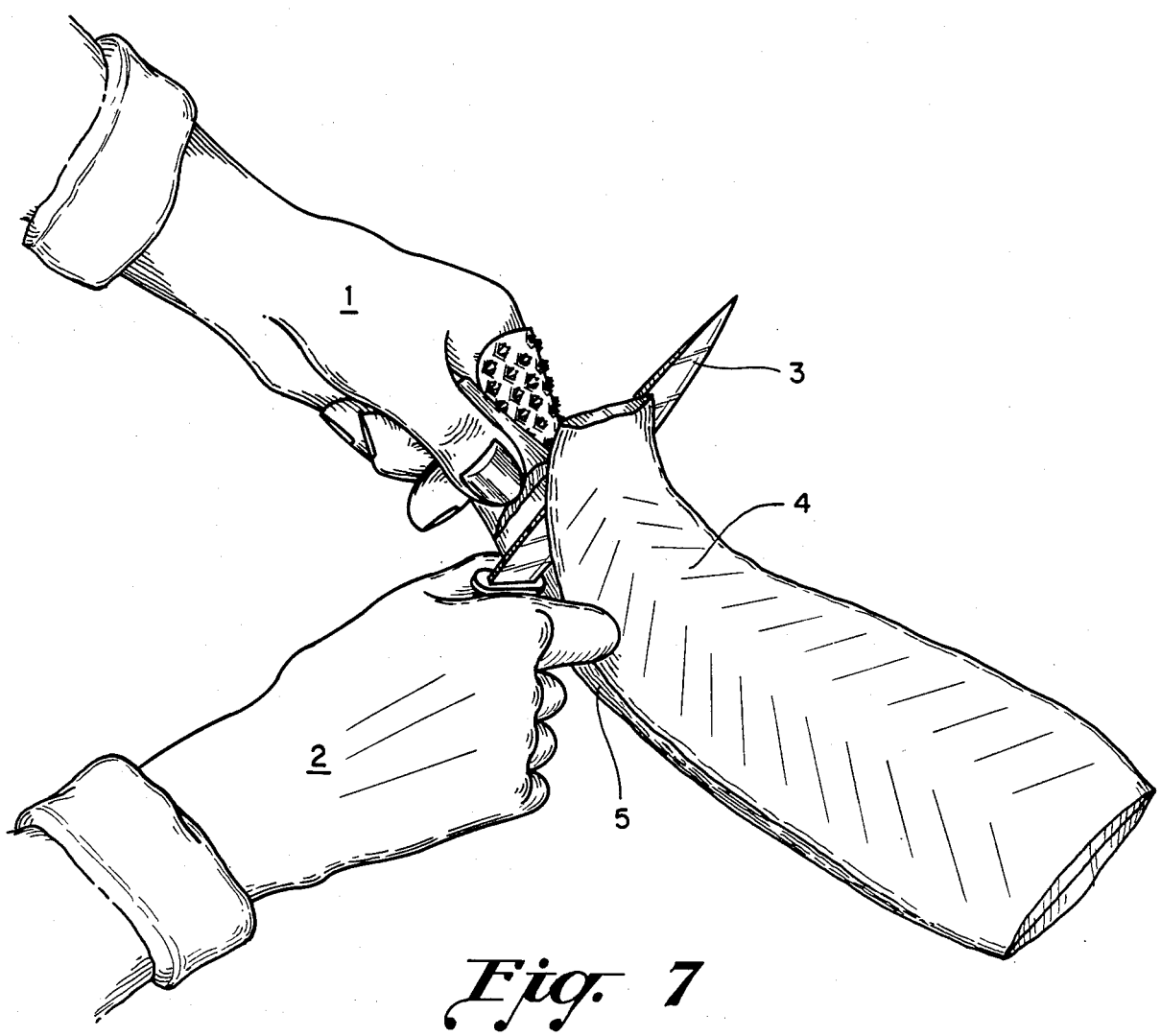
FIG. 7 is a perpective view showing the tool in use during the skinning process of a fillet.

Referring to FIG. 1 of the Drawings, the gripping tool is shown positioned for use on a hand 1. This Figure shows the tool on the right hand of a user although it could also be used on the left hand as shown in FIG. 7 of the Drawings. The other hand 2, as seen in FIG. 7, holds a knife 3 which is used to separate the fillet 4 from the skin 5 while the tail portion of the fillet is grasped between the thumb and forefinger of the user of the tool.

Figure 2:
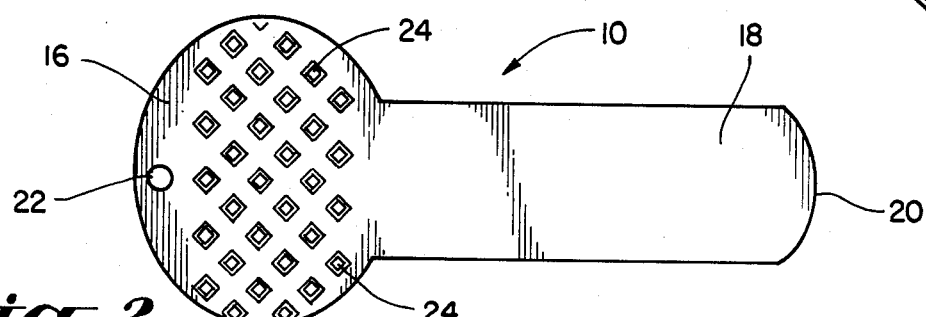
FIG. 2 is a top view of the tool before it has been formed to its operational S-shape.
Figure 3:
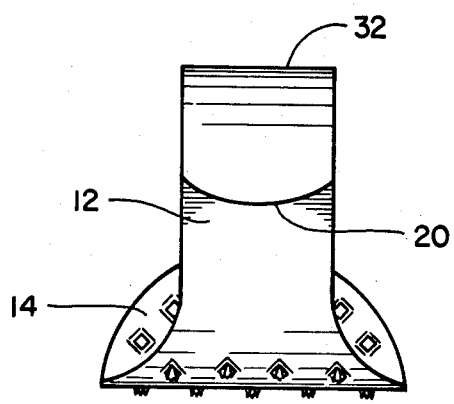
FIG. 3 is a top view of the gripping tool showing the hooked tail portion.
Figure 4:
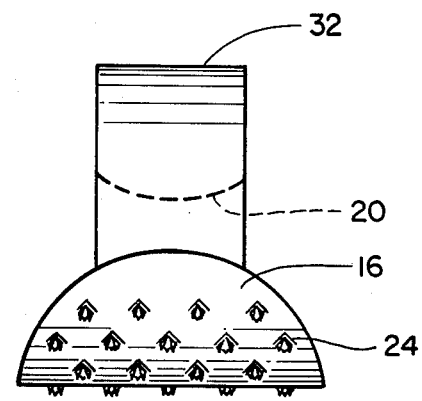
FIG. 4 is a bottom view of the gripping tool showing the hooked head portion.
Figure 5:
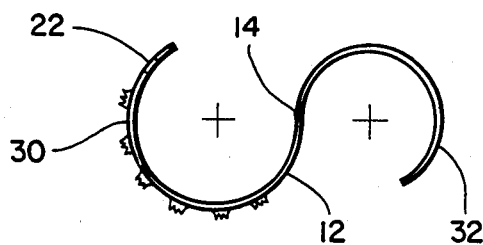
FIG. 5 is a side view of the gripping tool showing its generally S-shape.

Although the tool is formed to a generally S-shape for use as shown best in FIG. 5 of the Drawings, it is initially formed from a generally key shaped body 10 as can be seen in FIG. 2. The body has a first surface 12 and an opposite second surface 14 which are shown in FIGS. 3, 4 and 5 of the Drawings. The body can be made of stainless steel having a thickness of 0.006 inches or some other suitable material and includes a substantially circular head portion 16 and an extending tail portion 18 having a width substantially one-half the diameter of the head portion and also having a generally rounded end 20. It has been found suitable for the head portion to have a diameter of approximately 2 inches with the body having an overall length of about 4.5 inches before being formed to its S-shape. Of course the dimensions could be varied to better suit the hand size of a particular user.

Adjacent the top of the head portion, an aperture 22 is provided so that the tool can be readily stored on a hook or nail when not in use.

Figure 6:
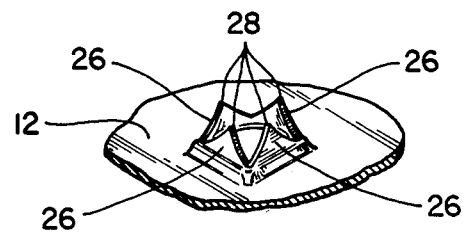
FIG. 6 is a partial perspective view showing a punched perforation.

A plurality of generally square perforations 24 are provided in the head portion between the aperture 22 and the tail portion 18. As shown in FIG. 6, each perforation provides four generally triangular gripping surfaces 26, each having a point 28 extending upward from the first surface 12 of the body. It has been found that six offset rows of perforations provide sufficient gripping means to secure a fish fillet between a thumb and forefinger of a user to enable the user to apply pressure with the thumb, securing the skin of the fillet against the gripping means.

The body is formed to a generally S-shape, providing a hooked head portion 30 and an oppositely hooked tail portion 32. Preferably, when in use, the hooked head portion 30 overlies the forefinger while the hooked tail portion underlies the middle finger as seen in FIGS. 1 and 7. The pliable body allows the tool to be further formed or adjusted for the comfort of the user.

The tool faciliates an unencumbered, "positive" grip of a fish fillet for separating the skin from the fish. The user, with the tool positioned as shown in FIGS. 1 and 7 or, if preferred, with the tool rotated 180° about its longitudinal axis so that the oppositely hooked portions are wrapped around the same fingers but in opposite directions, grasps the tail end of a fillet between the thumb and forefinger and presses the skin 5 of the fillet against the gripping means. The cutting knife 3 can then be inserted with the other hand into the fish adjacent the tool, positioning the blade parallel to the skin at the point where the fish meets the skin and ready to separate the fish from the skin. With the thumb holding the tail firmly against the gripping means, the user pulls the fillet with the gripping hand away from the cutting knife while also moving the fillet back and forth along the knife blade which facilitates ready separation of the fish from the skin. The back and forth movement of the pulling hand 1 represents alternate movement of the hand away from and toward the body of the user within the distance defined by the length of the knife blade.

While the invention has particularly been shown and described with reference to a preferred embodiment, it will be understood by those skilled in the art that variations in form, construction and arrangements may be made therein without departing from the spirit and scope of the invention, all such variations are intended to be covered in the appended claims.

I claim:

1. A gripping tool for gripping fish to assist in the filleting process, said tool adapted for inter digital placement over the forefinger and a second finger of a user's hand comprising:
 a generally S-shaped body having an upper hooked portion adapted to overlie said forefinger and a lower hooked portion adapted to overlie said second finger and a first side surface and an opposite side surface; and
 gripping means provided on said first side surface of said upper hooked portion for retaining an object which is pressed against said gripping means.

2. A gripping tool as claimed in claim 1, wherein said gripping means comprises a plurality of perforations, each perforation providing a plurality of gripping surfaces.

3. A gripping tool as claimed in claim 1, wherein said body is made of stainless steel.

4. A gripping tool as claimed in claim 1, wherein said upper hooked portion is substantially circular and has a predetermined diameter and said lower hooked portion is substantially rectangular with a width substantially one-half said predetermined diameter.

5. A gripping tool as claimed in claim 4, wherein said upper hooked portion includes a top portion and an aperture adjacent said top portion.

6. A gripping tool for gripping fish to assist in the filleting process, said tool adapted for inter digital placement over the forefinger and a second finger of a user's hand comprising:
 a singular sheet, pliable body having a head portion and a tail portion, said head portion having a first side surface and a second side surface;
 gripping means for gripping said fish provided on said first side surface, said body being sufficiently pliable, shaped and dimensioned to be readily bent to wrap said head portion around said forefinger with said second side surface against said forefinger and said first side surface facing outward from said forefinger and to wrap said tail portion around said second finger whereby said tool can be retained on said user's hand.

7. A gripping tool as claimed in claim 6, wherein said head portion is substantially circular and has a predetermined diameter and said tail portion is substantially rectangular with a width substantially one half said predetermined diameter.

8. A gripping tool as claimed in claim 6, wherein said gripping means comprises a plurality of perforations, each perforation providing a plurality of gripping surfaces.

9. A gripping tool as claimed in claim 8, wherein said body is made of stainless steel.

10. A gripping tool as claimed in claim 6, wherein said head portion includes a top portion and an aperture adjacent said top portion.

* * * * *